United States Patent [19]

Kroll et al.

[11] Patent Number: 5,797,011

[45] Date of Patent: Aug. 18, 1998

[54] METHOD FOR CONTROLLING THE TRANSLATION OF INFORMATION ON A DISPLAY SCREEN FROM A SOURCE LANGUAGE TO A TARGET LANGUAGE

[75] Inventors: Oren Kroll, Marietta; Rian Lee Emrick, Stone Mountain; David Winser Johnston, Dunwoody, all of Ga.

[73] Assignee: International Business Machines Corporation, Armonk, N.Y.

[21] Appl. No.: 478,169

[22] Filed: Jun. 7, 1995

Related U.S. Application Data

[62] Division of Ser. No. 195,743, Oct. 23, 1990, abandoned.

[51] Int. Cl.⁶ .................................................. G06F 3/14
[52] U.S. Cl. ................................. 395/705; 395/758
[58] Field of Search ................................. 395/705, 758

[56] References Cited

U.S. PATENT DOCUMENTS

| | | | |
|---|---|---|---|
| 4,599,612 | 7/1986 | Kaji et al. | 395/753 |
| 5,157,606 | 10/1992 | Nagashima | 395/758 |
| 5,351,189 | 9/1994 | Doi et al. | 395/758 |
| 5,416,903 | 5/1995 | Malcolm | 395/758 |

*Primary Examiner*—Emanuel Todd Voeltz
*Assistant Examiner*—John Q. Chavis
*Attorney, Agent, or Firm*—Kenneth A. Seaman

[57] ABSTRACT

A method for controlling the translation of panel displays and associated panel tags on a display screen from a source language to a target language comprising the steps of: opening a source language panel file and a target language panel file containing text and panel tags; translating said source language panel file and writing the output to said target language panel file; displaying in a plurality of windows on said display screen a source language panel tag file, a target language panel tag file, an image of the source panel and an image of the target panel; and modifying said target language panel tag file if viewing the image of the target panel indicates the target language panel file requires modification.

20 Claims, 10 Drawing Sheets

```
         45       49        51   47       53
          /       /         /    /        /              43
<panel name=pdel602 help= pdi3080>Component Data
<-- Imbed common                                          -->
<-- action bar                                            -->

<imbed name=eknab000>
<-- Imbed common                                          -->
<-- header                                                -->
                             55
<imbed name=pdbhd001>
<-- * pmtwidth=50                                         -->

<dtacol pmtwidth=35>

<dtafld name=BCOMPNBR help=pdi3049 usage=out
         cuaprompt entwidth=23>Component item number <dtafld name=BCOSEQNR help=pdi3050 usage=out
         entwidth=11>Sequence number <dtafld name=BPLNCODE help=pdi3051 varclass=pdvb0004 required=yes
         cuaprompt entwidth=44>
BOM planning <dtafld name=BMFGPLNG help=pdi3129 varclass=pdvb0008
         cuaprompt entwidth=36>Manufacturing planning <dtafld name=BCOMITYP help=pdi3052 varclass=pdvi0001 required=yes
         cuaprompt entwidth=47>Item type <dtafld name=BCOMAQTY help=pdi3053 varclass=pdva0001 required=yes
         cuaprompt entwidth=13>
Quantity per assembly <dtafld name=BCOMDESC help=pdi3054 entwidth=31>Description
</dtacol>
</panel>
```

FIG. 4A

```
SHOW   LXDTL.DLL Version 0.9995 panel display tool
  FILE Name = C:\LPEX\A100\PDE1602.PAN
 : PDE1602 _ _ _ _ _ _ _ _ _ _ _   Component Data _ _ _ _ _ _ _ _ _ _ _ :
 :
  IMBED FILE Name = C:\LPEX\A100\EKNAB000.IMB
  IMBED FILE Name = C:\LPEX\A100\EKNAB005.IMB
  IMBED FILE Name = C:\LPEX\A100\EKNAB001.IMB
     File
    1.  New
    2.  Open...
    3.  Save
    4.  save As...
    5.  Delete
    6.  Print
    7.  add to Working
    8.  Replace all
    9.  NEW CHILD
   10.  eXit
  IMBED FILE Name = C:\LPEX\A100\EKNAB002.IMB
    File   Edit
       1.  cut (Move)
       2.  cUt except
       3.  Copy
       4.  copy eXcept
       5.  Paste
       6.  Replace
       7.  View clipboard
  IMBED FILE Name = C:\LPEX\A100\EKNAB003.IMB
      File  Edit   View
           1.  Find
           2.  Sort
```

57

```
IMBED FILE Name = C:\LPEX\A100\EKNAB009.IMB
 File    Edit     View    Help
                  1.  Help for help
                  2.  Extended help
                  3.  Keys help
                  4.  help Index
                  5.  Tutorial
                  6.  About                        55
 IMBED FILE Name = C:\LPEX\A100\PDBHD001.IMB Item number .......  __________________
Item name .......    __________________
Change ID .......    __________________
Item type   .......  __________________
Location ID .......  __________________
Component item number ........... __________________
Sequence number .................. ____________
BOM planning..................... ______________________
Manufacturing planning ............ ______________________
Item type ....................... ______________________
 :                                                      :
 -------------------------------------------------------

-------- Help File names found ---------
                                               59
PDI3056
PDI3056
------ Varclass File names found ---------
                                               61
PDVB0007
PDVB0006
----------- <END_OF_OTL ----------
```

FIG. 4B   57

| FIG.4A |
|--------|
| FIG.4B |

```
<-- Imbed for common BOM header used                    -->
<-- on several BOM panels (eng/mfg)         --          -->
   <dtacol pmtwidth=18>
       <dtafld name=ITMNUMBR usage=out
             entwidth=10>Item number
       <dtafld name=ITEMNAME usage=out
             entwidth=20>Item name
       <dtafld name=ICHANGID usage=out
             entwidth=10>Change ID
       <dtafld name=ITEMTYPE usage=out varclass=pdvi0001
             entwidth=18>Item type
       <dtafld name=ILCATNID usage=out
             entwidth=18>Location ID
</dtacol>
```

FIG. 7

```
<!-- EXTENDED HELP      Additional comments here     -->
<HELP NAME=PDI3088      >
HELP: Extended Help
<ITOP ROOTS="A">
   Index topic
<ISYN ROOT="A">
   Index synonym
<INFO>
Use Substitute Item to view or maintain substitute items for a BOM component. A
   substitute component is an item that can replace a BOM item within a specific B
OM. The substitute items vary by manufacturing locations that use the BOM.
<p>
For example, if a power tool that usually uses 120 volt motors is being produced
   for sale in a country that uses 220 volt motors, the 220 volt motors would be s
unsuitable items for 120 volt motors.
<p>
To create or change substitute component data, you must type data in both fields
   and use Enter. The data in the top portion of the window shows the component i
system for which you are maintaining substitute item data.
</INFO>
```

FIG. 8

```
SHOW  LXDTL.DLL Version 0.9995 panel display tool
 FILE Name = C:\LPEX\A100\PDI3088.HEL — — — — — — — — HELP: Extended Help — — — — — — — — —

— — — — — — — — Help Index Topic = A — — — — — — — —
Index topic
— — — — — — — — — — — — — — — — — — — — — — — — —

— — — — — —Help Index Synonym = A — — — — — — — —
Index synonym
— — — — — — — — — — — — — — — — — — — — — — — — —

PDI3088 — — — — —   — — — — — — — — — — — — — —

Use Substitute Item to view or maintain
      substitute items for a BOM component. A
      substitute component is an item that can
      replace a BOM item within a specific
      BOM. The substitute items vary by
      manufacturing locations that use the
      BOM.

For example, if a power tool that
      usually uses 120 volt motors is being
      produced for sale in a country that uses
      220 volt motors, the 220 volt motors
      would be substitute items for 120 volt
      motors.

To create or change substitute component
      data, you must type data in both fields
      and use Enter. The data in the top
      portion of the window shows the
      component item for which you are
      maintaining substitute item data.

— — — — — — — — — — — <END_OF_DTL — — — — — — — —
```

<MSG SUFFIX=0 MSGTYPE=NOTIFY HELP=EKNS440>
The sequence for the Department number you entered has been deleted.
</MGS>

FIG. 10

SHOW   LXDTL.DLL Version 0.9995 panel display tool

FILE Name = C:\LPEX\A100\EKNS440.MSG

: EKNS440 ─────  ──────────────:
:
:     The sequence for the Department number
:     you entered has been deleted.
:
:
:
 ────────────────────────────

──────── Help File names found ─────────

EKNS440

─────────── <END_OF_DTL ────────

FIG. 11

```
<varclass NAME=pevc0003 MSG=pevcm003>
  <xlatl USAGE=BOTH CASE=IGNORE FORMAT=UPPER>
75  <xlati VALUE=ASM><tsf e=30 ON>ASM</tsf>
77  <xlati VALUE=CLE><tsf e=40 ON>CLE</tsf>
79  <xlati VALUE=REW><tsf e=50 ON>REW</tsf>
  </xlatl>
  <checkl MSG=peclm003>
   <checki TYPE=ALPHA>
   <tsftag>checki TYPE=VALUES PARM1=EQ
   PARM2='tsfspot><tsf e=60 ON>asm ASM cle CLE rew REW</tsf></tsfspot>'
   </tsftag></check1>
</varclass>
<-- ***************************************** -->
```

FIG. 12

```
SHOW   LXDTL.DLL Version 0.9995 panel display tool

FILE Name = C:\LPEX\A100\PEVC0003.VAX

- - - - - - - - - -<XLATI Translatable end - - - - - - - -
ASM  /75
CLE  /77
REW  /79

- - - - -<CHECKI Translatable TYPE=VALUES PARM2='data' - - - asm ASM cle CLE rew REW

- - - - - - - - - - - <END_OF_DTL - - - - - - - -
```

METHOD FOR CONTROLLING THE TRANSLATION OF INFORMATION ON A DISPLAY SCREEN FROM A SOURCE LANGUAGE TO A TARGET LANGUAGE

The application is a division of application Ser. No. 08/195,743, filed Oct. 23, 1990, now abandoned.

TECHNICAL FIELD

This invention relates to a method for controlling the translation of information to be displayed on the screen of a computer from a source language to a target language. More specifically, this invention relates to a method for controlling the translation of information wherein the source language information (source panel file), and all files referred to within the source panel file (related parts files), can be accessed and displayed for translation, in context, of the textual information contained in the source panel file and related parts files.

In the development of new software products, such products oftentimes have a broad range of applications that can be used in a number of different countries. As a result, the textual information shown on the video display of a computer during operation of the program, sometimes referred to as panels or screens, must be presented in various languages understandable to the program user.

The process of translating from one language to another generally has a number of associated linguistic problems. These problems broadly encompass interpreting various terminologies and dialects, utilization of proper gender and verb tense, etc. In translating individual lines of screen information, translators often lack the additional information necessary to place the text to be translated in proper context. Consequently, the resulting translation may be inaccurate or misleading and incorrectly convey meaning to the program user. This, in turn, causes rework to correct the defective translation and related maintenance to the program after it is in the computer of the customer.

Typically, translators are not, and preferably need not be, as well-versed and skilled in computer programming as they are in the art of language translation. Through the use of Dialog Tag Language (DTL), a high level computer software language, developers of software programs can separate the underlying software code (a set of rules or instructions representing data in a symbolic form that can be accepted by a computer processor) from all information to be displayed on the video display of a computer. DTL employs dialog tags that include code that controls the positioning textual information. This textual information, which is ultimately displayed on the computer screen, is usually written in English and can then be translated into other languages.

Besides having dialog tags that control the display of information on panels, there are also tags that permit the separation of groups of dialog tags and text into separate files. This separation of files allows the software developer to reuse common portions of a screen or panel definition, that is, the various dialog tags and text making up the particular panel file, on many different screens. DTL permits the developer to define these common groups of tags and text, called Imbed files, only once and then to reference the particular Imbed file in any panel file that requires it. This not only has the benefit of making the developer more productive (an Imbed file is written one and used many times), but has a similar productivity gain for subsequent text translation; instead of having to translate the same block of text in many different panels, the translator only translates the Imbed file once.

DTL also provides a means for associating specific screens with related Help files and specific fields within a screen with Context Sensitive Help. Help files contain additional information intended to provide online assistance at the program user's request about the subject and purpose of a given panel. Context Sensitive Help is specific help information about a particular field within a panel.

DTL also provides a mechanism for associating fields on a screen with separate Dialog Tag files, called Varclass files, that contain rules for validating any data entered in the field.

In addition, DTL provides a means for associating specific Message files that are referenced in the Panel file to, for example, inform the user that an error has occurred in data entry. Dialog Tag Language is described more particularly in IBM documentation, such as "Product Manager Dialog Tag Reference Manual," copyright IBM corporation, 1990.

While this scheme of defining Imbed, Help, Varclass and Message files a single time and allowing for reuse of them from many different panel files facilitates product development, it can and will induce difficulties and defects in the subsequent translation process described earlier. Translation may be performed more accurately when the translator can view simultaneously all files (panel, Imbed, Help, Varclass, Message) that build the complete panel so that the full context may be known.

Additionally, as a consequence of the large volume of Dialog Tag files in typical computer software products, several translators may be assigned to translate the files. While the use of multiple translators is intended to speed up the translation process, the effectiveness of this method is commonly diminished due to repetition of the same translations by the various translators and inconsistencies in translations between the various translators.

BACKGROUND ART

Typically, translation of the different panel files, Imbeds, etc., is performed using standard text editing application programs. Such text editing programs provide the translator with the capability to perform "translation in place", that is, translation by typing the target language words in place of the source language words. However, the translator is generally unable to display a view of the screen information being translated as it will be displayed to the program user until well after the translation process is completed. A process of compilation, or "formatting", of the translated files must occur prior to viewing the results in final form.

Moreover, as a result of differences in the lengths of equivalent words in the source and target languages, formatting problems, such as centering text, can arise. Usually, the formatting process occurs after all files are translated. This delays the opportunity for inspecting the formatted translated panels and is a very unproductive defect-resolution process.

DISCLOSURE OF THE INVENTION

It is an object of the present invention to provide a method for translating source panel information in context by providing the translator with access to all fields and files associated with the source panel.

It is a further object of the present invention to provide a method for translating source panel information that allows the translator to display both source and target panels during the translation process.

It is another object of the present invention to provide a method for translating source panel information that allows the translator to display both source and target panel images during the translation process.

It is yet another object of the present invention to provide a method for translating source panel information that eliminates repetition of and inconsistencies in translations performed by different translators on the same software program.

These and other objects, advantages and features are achieved by a panel tag translation tool that provides translators with the capability to translate source panel information into target language panels without modifying the underlying source code. Only the textual information to be displayed on the screen, which is called Machine Readable Information (MRI), is translated from its source language into a target language.

The panel tags translation tool further provides translators with the capability to translate source panel information in context and to display and translate all parts associated with the source panel. At any point in the translation process, the panel tags translation tool of this invention allows the translator to view his or her work as it would ultimately be displayed to a user of the software program. The panel tags translation tool maintains the source and target files separately, while allowing the translator to see side-by-side both source and target panels on the video display.

The panel tags translation tool resolves (reads) for the translator all Imbed files nested within the source and target panel files and displays the results on the screen. The panel tags translation tool also lists the Help, Message and Varclass parts referred to within the source and target files being displayed and permits the translator to display these related parts. The panel tags translation tool further allows the translator to compare images of the source and target panels just as they would appear during operation of the software program.

DESCRIPTION OF THE INVENTION

While the flow of machine readable information (MRI) through a translation center, from receipt from the software development lab to transmit for testing after the translation process is completed, may be different for each location, the MRI flow generally follows a common set of steps with the common difficulties as outlined above.

Translation centers typically receive the entire set of MRI that is to be translated as a binary package. The MRI may comprise several thousand individual files. The binary package is down loaded and unpacked to many small files in a common source directory in a translation center computer, such as an IBM PS/2 personal computer. The resulting MRI files are copied to diskettes for distribution to individual translators' systems. Each translator's individually assigned files for translation are loaded on diskettes in the form of a file list which forms that translator's source directory. The MRI files in the common source directory are loaded to each translator's computer system and the translators can then begin the translation process. The translator selects a file from his or her source directory to translate and begins to work. During translation, the translator may also search for words in a dictionary file or for synonyms or previous possible words used in a repetition file. In order to validate the translator's work, the translator may check terminology of the translated file by proof reading the file on-line or printing the file for proof reading off-line. The translator may also check the format of the translated file by invoking the panel tags translation tool of this invention to format the source or target MRI files and display the panels as they would look to the ultimate user. Each translator's translated MRI files are stored in that translator's target directory and then can be copied to diskettes for loading into a common target directory in the translation center computer. The translated MRI files are converted to a binary package and uploaded. Once all files are verified and validated, they are transmitted to a Post Translation Site for further processing.

Figure 1:
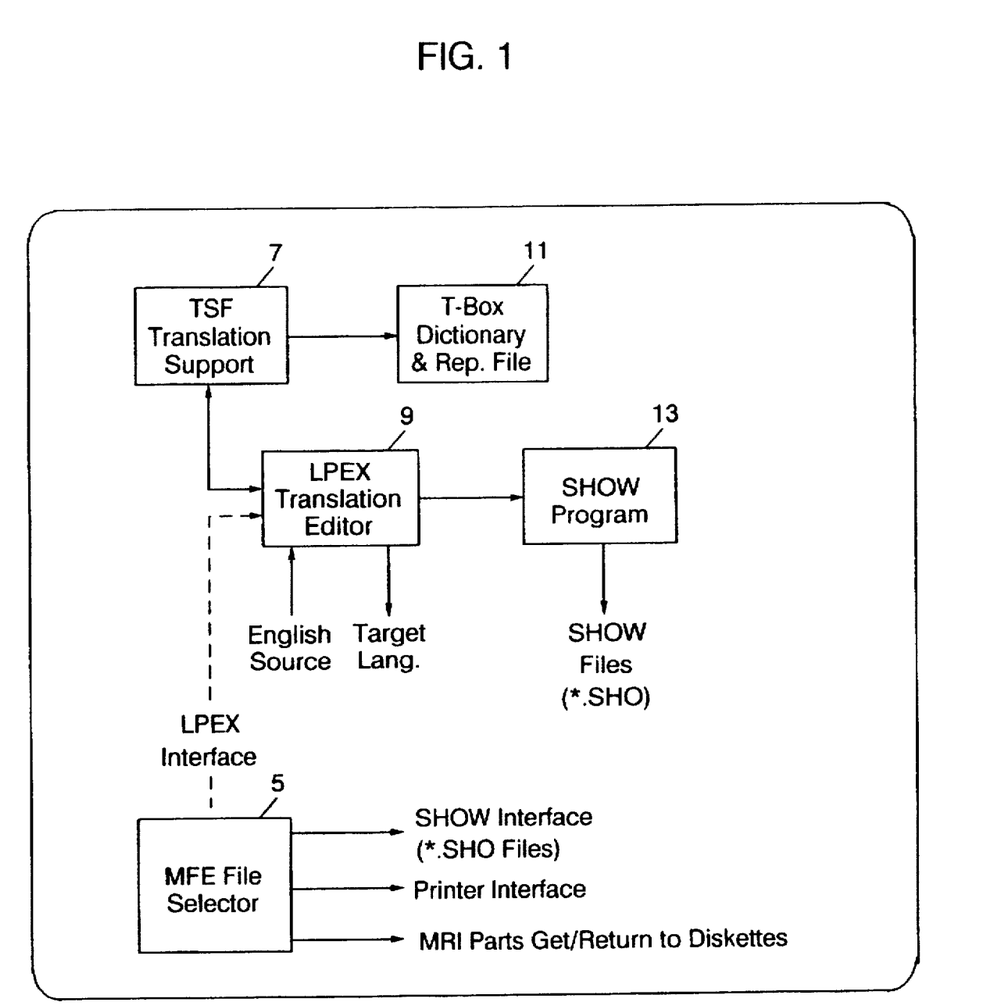
FIG. 1 is a schematic drawing of a preferred embodiment of a translation center environment in which the present invention is employed.
Figure 2:
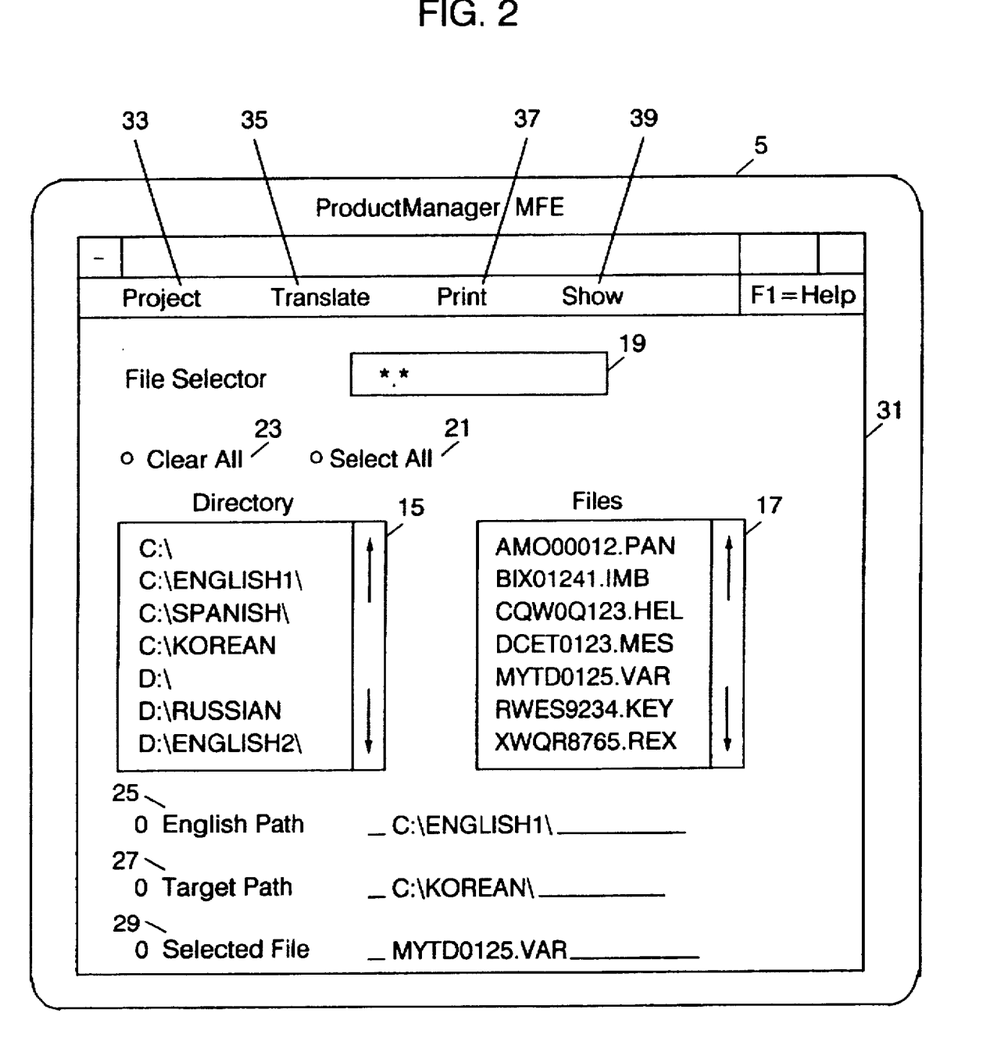
FIG. 2 shows a preferred embodiment of a front end file selector panel displayed on a video display.

In the preferred embodiment shown in FIGS. 1 and 2, the translator's working environment is invoked from a front end file selector 5. The file selector 5, called My Front End (MFE), is responsible for setting up a source directory 25 (path) from which the file to be translated (source file) is selected and a target directory 27 in which the translated file (target file) will be stored. MFE provides the translator with a shell (main menu) around several of the computer software programs (tools) needed and used during translation. MFE follows Object-Action logic, in which the Object(s) on which an Action is to be performed are identified and then the Action that is to be performed is requested. Thus, MFE allows the translator to select the source path 25 and target path 27 and one or more selected (source) files 29 to perform an operation on, then select a function to be performed, such as the Translate function 35, to translate a source MRI part and store the translated part in the target directory 27. MFE will validate the translator's request and if valid will perform the function on all files selected.

Referring again to the embodiment shown in FIG. 2, the MFE window can be divided into four regions. In the lower middle region, the translator is provided with access to directory and file listings. The translator can scroll through the directories window 15 to select the source directory and target directory in which he or she wishes to work, then select the file(s) listed in the files window 17 on which an action is to be performed.

The upper middle region is the File Selector window 19, which allows the translator to narrow down a selection of files to be displayed in the files window 17 of the lower middle region and/or to select all/clear all files in the files window 17. In this embodiment, the default File Selector is *.*, however, if, for example, the translator wishes to access only panel parts, then the filename extension can be modified to *.pan, which automatically will limit the files listed in the files window 17 to files with the file extension .pan. The Select All function 21 allows the translator to select all of the files displayed in the files window 17 as the objects on which an action, such as PRINT, can be performed. The Clear All function 23 allows the translator to clear all selected files in the files window 17.

The lower region provides the source and target locations of the MRI parts. This information is input to the panel tags translation tool to direct it where to obtain this information. The source path 25 identifies the path to source MRI files to be translated. The target path 27 identifies the path to target MRI files that have been translated. The selected file 29 identifies the source MRI file that is to be translated. Preferably, the resulting target file is given the same file name as the source file.

The upper region of the MFE window is the Action Bar 31, which provides the actual function (action) to be performed. Actions use information (objects) from the other three regions to identify the file(s) on which the desired function is to be performed. Each Action, when selected, provides the translator with a pulldown list of Action Items that can be performed on the selected file(s).

In this embodiment, for example, the Project 33 pulldown includes Action Items that allow the translator to copy all files in the target directory to a diskette, such as when the translator has completed all current translation assignments and wants to return the translated files to the translation center, or copy all source files on diskettes to the source directory, such as when the individual translators' files are assigned. The Translate 35 pulldown provides the translator with access to text editors, such as the LPEX translation editor. The Print 37 pulldown includes Action Items that allow the translator to print the selected source or target MRI file(s) or print the SHOW result of the selected source or target file(s), that is, the result of invoking the panel tags translation tool on the selected file(s). The SHOW 39 pulldown includes Action Items that allow the translator display the SHOW result of the selected source or target MRI file(s) in an OS/2 window or run SHOW on the selected source or target file(s) without displaying, such as for off-line printing.

Once the translator selects a source file 29 to translate, he or she is then presented with an editing session, through which the MRI is translated. For example, as shown in FIG. 1, Translation Support Facility (TSF) 7 is a tool that interfaces a text editor, such as the LPEX translation editor 9, for translation of MRI parts. When a file is requested to be processed by TSF, TSF will open and read the file and present the file in an LPEX window. The translator can, for example, request dictionary help (using a function key) from the T-Box Dictionary and Repetition File 11 and a second LPEX window can be opened in which words and phrases to be translated in the source are equated with possible target language words and phrases. This repetition file 11 saves information as the translation process proceeds. Consequently, TSF provides not only dictionary suggestions for a translated word or phrase, but also suggestions from previously used words and phrases.

While the translator is editing the selected file 29, he or she may wish to see a display of the source or target MRI as it would be viewed by the ultimate user, sometimes referred to as a "What You See Is What You Get" (WYSIWYG) display. The translator can then invoke the panel tags translation tool 13 of this invention by selecting SHOW 39 from the MFE action bar 31 or LPEX action bar (not shown) and be presented with a WYSIWYG display on the source or target MRI part, replicating the appearance of the part under normal operation of the program.

The panel tags translation tool 13 resolves nested imbeds in the MRI part selected and displays the results on the video screen. The translator only sees the final result of the panel. The final result will not contain information which details from which imbed certain lines are extracted. The panel tags translation tool also informs the translator of and displays the Help, Message and Varclass parts referred to within the MRI part. This information is provided for translation in context, allowing the translator to translate the text of Help, Message and Varclass parts together with the panel text.

In the case of source MRI panels, at any time during the translation process, if the translator wishes to invoke SHOW on the source panel, the common source directory will be searched for each source Imbed part referenced in the source panel and a WYSIWYG picture of the source panel with all nested Imbeds resolved will be displayed. If in addition to the source panel, the translator wishes to display the related parts, the common source directory will be searched for each source Help, Message and Varclass part related to the source panel and a WYSIWYG picture of these parts will also be displayed.

In the case of target MRI panels, at any time during the translation process, if the translator wishes to invoke SHOW on the target panel being translated, the common target directory will be searched for each target Imbed part referenced in the target panel and a WYSIWYG picture of the target panel with all nested Imbeds resolved will be displayed. If, in addition to the target panel, the translator wishes to display the related parts, the common target directory will be searched for each target Help, Message and Varclass part related to the target panel and a WYSIWYG picture of these parts will also be displayed.

When SHOW is invoked on related target parts, the translator may or may not access target parts that have already been translated. If a particular target part, such as a Help or Message part, has been translated, the translator will be able to display that target part as translated. However, if that target part has not yet been translated, then the source language part will be displayed. The panel tags translation tool eliminates repetition of translation of the same part by different translators, as well as inconsistencies between translations of the same parts by different translators, by arranging the directory search hierarchy as follows when SHOW is invoked on a target panel: first, the individual translator's target directory, in which all target files assigned to that translator that have been translated are stored, is searched for related target parts; second, the common target directory, in which all target files translated by all translators are stored, is searched; third, the common source directory, in which all source files to be translated are stored, is searched; last, the individual translator's source directory, in which the various files assigned to that translator for translation are stored, is searched.

In this way, the panel tags translation tool informs the translator whether a particular target part that is referenced in the target panel being translated has been translated, whether by that translator or by some other translator. Preferably, target parts associated with a particular target panel assigned to a translator that have been or are to be translated by another translator are displayed in a manner, such as using different colors, that indicates that the related target part is not to be translated with that target panel. The panel tags translation tool saves the translator from inadvertently repeating translations that have already been performed and eliminates inconsistencies between translations of the same target part by different translators. Ultimately, the translator may be required to only translate an individual target panel itself, where all related target parts already have been translated. Moreover, even in situations where an associated target part has not been translated, it may nonetheless be displayed in connection with the target panel being translated to provide context for that translation.

When the panel tags translation tool of this invention is applied to a source panel by invoking SHOW, related source parts are located using an inverted directory search hierarchy from that stated above: first, the individual translator's source directory, in which the various files assigned to that translator for translation are stored, is searched; second, the common source directory, in which all source files to be translated are stored, is searched; third, the common target directory, in which all target files translated by all translators are stored, is searched; and last, the individual translator's target directory, in which all target files assigned to that translator that have been translated are stored, is searched.

In the preferred embodiment shown, the panel tags translation tool can be invoked to display source and target MRI in several ways. Through MFE, the translator can display the source panel MRI, the SHOW result of the source panel (with all nested imbeds resolved), the target MRI and the SHOW result of the target panel (with all imbeds resolved). The panel tags translation tool can also be invoked through LPEX text editor to display the SHOW result of the source or target panels, to display the SHOW result with all pulldowns expanded and to display the SHOW result with all pulldowns and helps expanded.

At any point in the translation process, the translator can request a WYSIWYG display of the MRI part he is translating by invoking SHOW. When SHOW is invoked, an additional window is opened along side the panel or part currently being displayed and a picture of how the MRI panel or part will be seen by the user of the program being translated will be presented. If the translator wishes to compare the current translated (or partially translated) panel or part with the source panel or part, the translator may invoke SHOW on the source file. Use of the panel tags translation tool will be further explained in connection with a series of figures.

Figure 3:
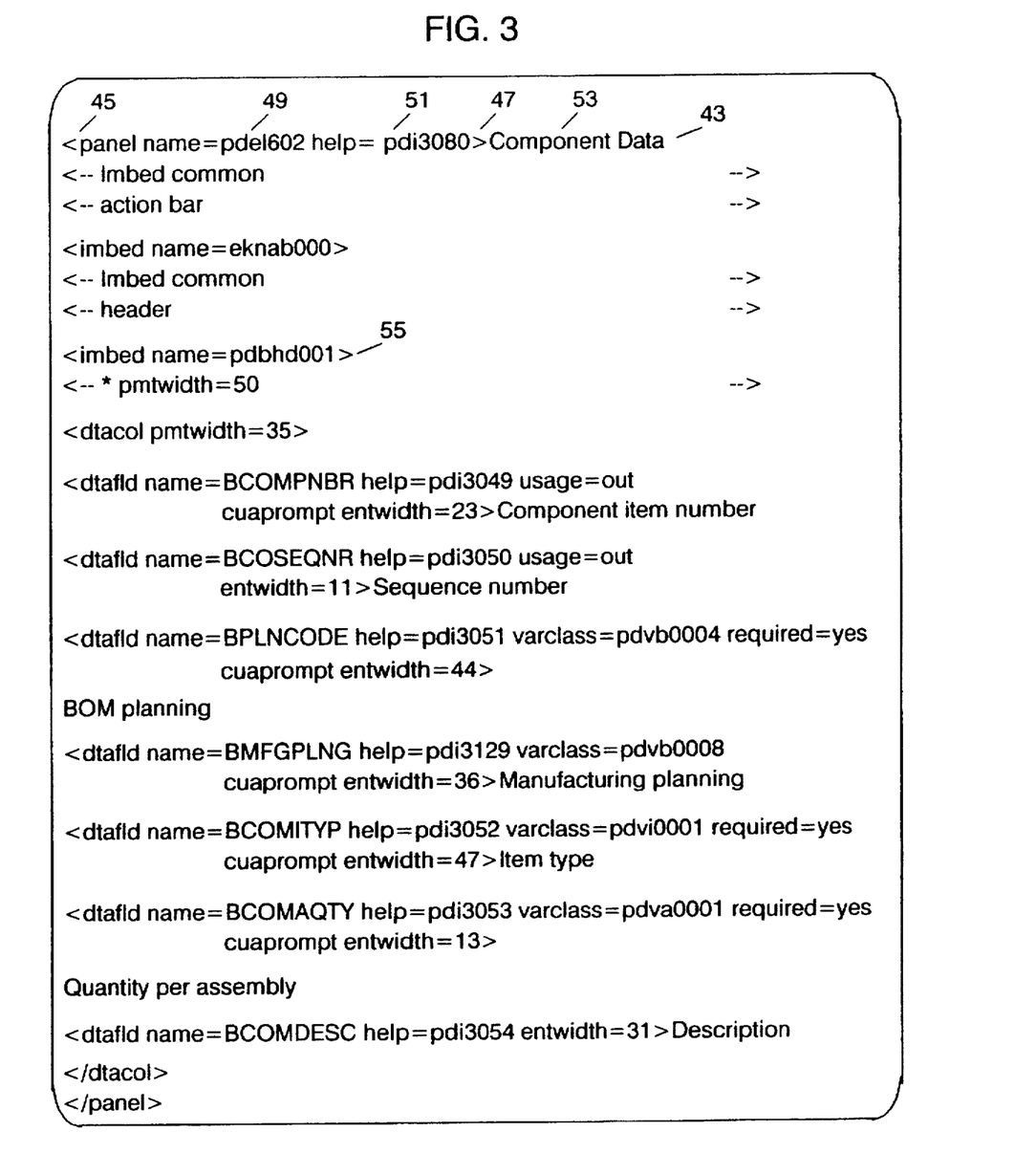
FIG. 3 shows a source panel as displayed on a video display during an editing session.

FIG. 3 shows a source panel 41 as seen during an editing session. The first line indicates a complete dialog tag 43, delimited by a start tag marker "<" 45 and an end tag marker ">" 47. Within the tag markers are tag attributes. Immediately following the left marker is the tag key word "panel" 49 that identifies the tag. The tag markers may or may not include other attributes, such as related help part "help=pdi3080" 51. Any information occurring after the right marker and before the next left marker is text, such as "Component Data" 53. It is this textual information, and not the tag itself, that is generally translated. By default, all tags are protected from modification.

Figure 4A:
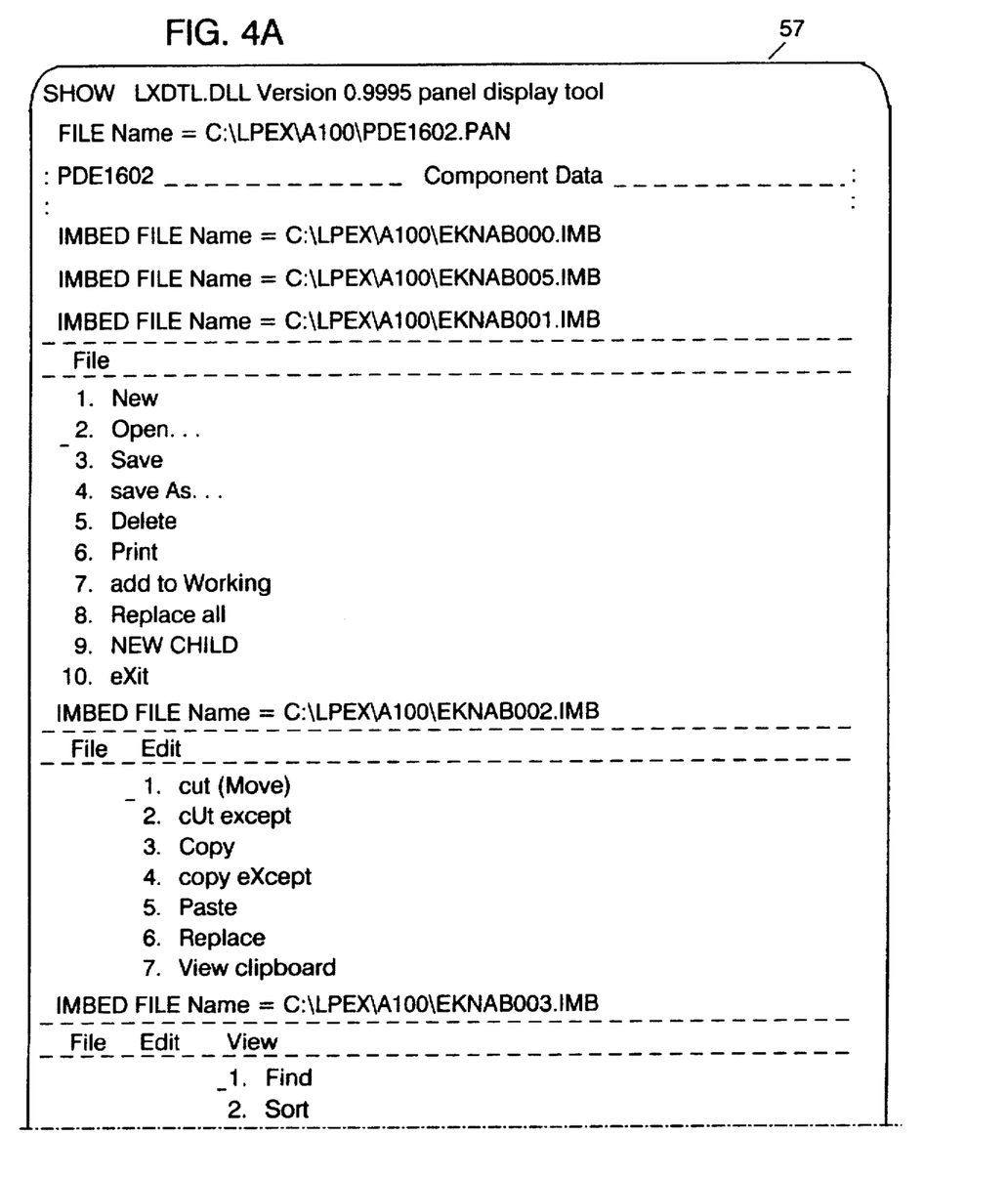
FIGS. 4 and 5 shows a SHOW result of the source panel of FIG. 3 as displayed on a video display after application of the panel tags translation tool of this invention.
Figures 4B, 5:
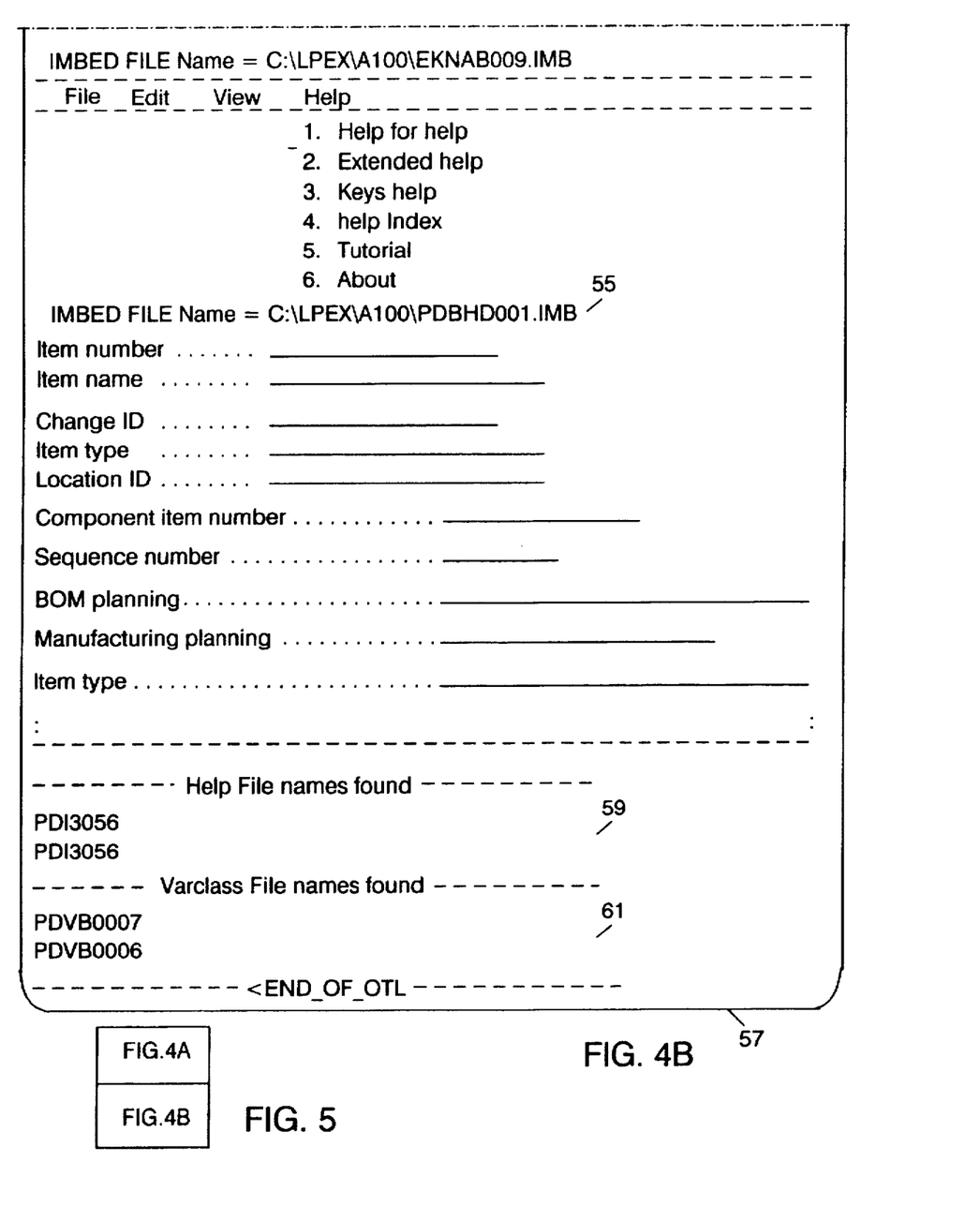
Figure 6:
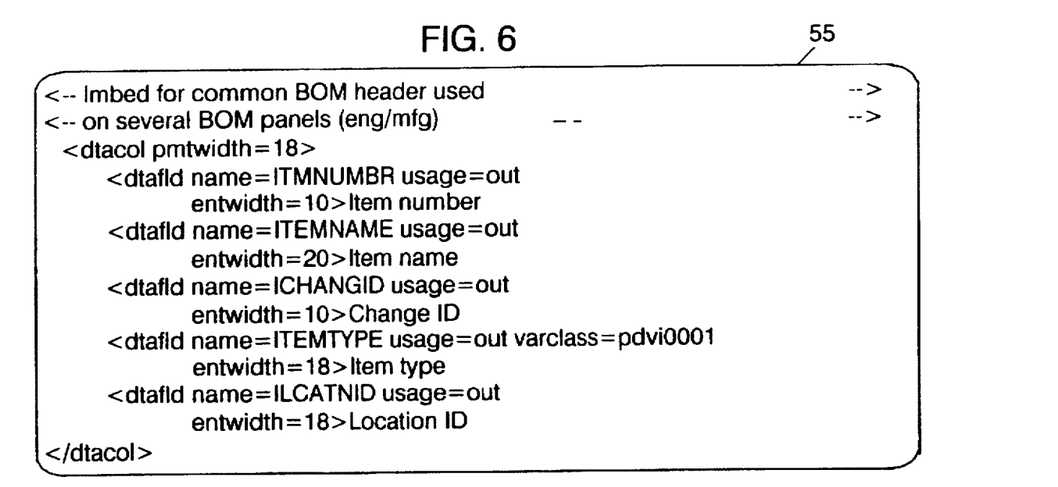
FIG. 6 shows a source Imbed part as displayed on a video display during an editing session.

FIGS. 4 and 5 shows the SHOW result 57 of the source panel 41 of FIG. 3. with all pulldowns expanded. The SHOW tool resolves all nested imbeds defined in the source panel, such as "Imbed name=pdbhd001" 55, which is shown in FIG. 6 as a source imbed part 55. Moreover, as shown in FIG. 5, the translator is provided with a related Help parts list 59 and a related Varclass parts list 61, which the translator can then display and/or translate if desired.

Figure 7:
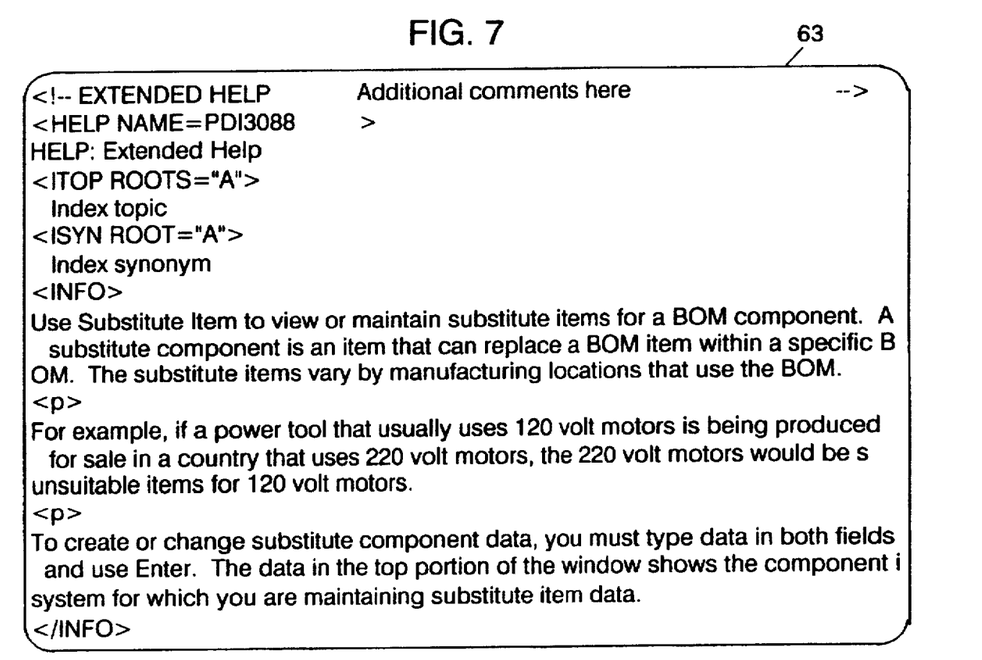
FIG. 7 shows a source Help part as displayed on a video display during an editing session.
Figure 8:
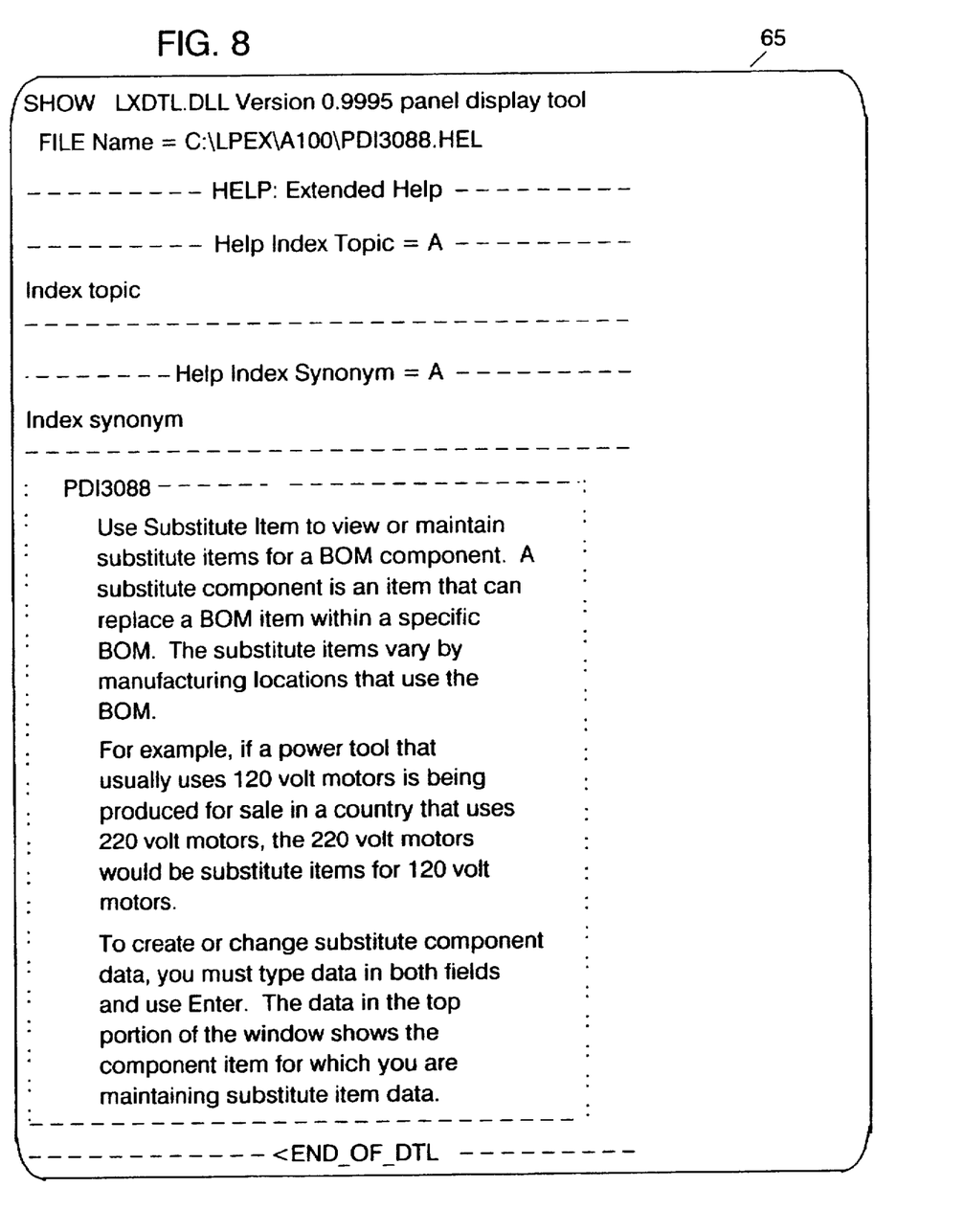
FIG. 8 shows a SHOW result of the source Help part of FIG. 7 as displayed on a video display after application of the panel tags translation tool of this invention.

FIG. 7 shows a source Help part 63 as seen during an editing session and FIG. 8 shows the SHOW result of that Help part 65.

Figure 9:
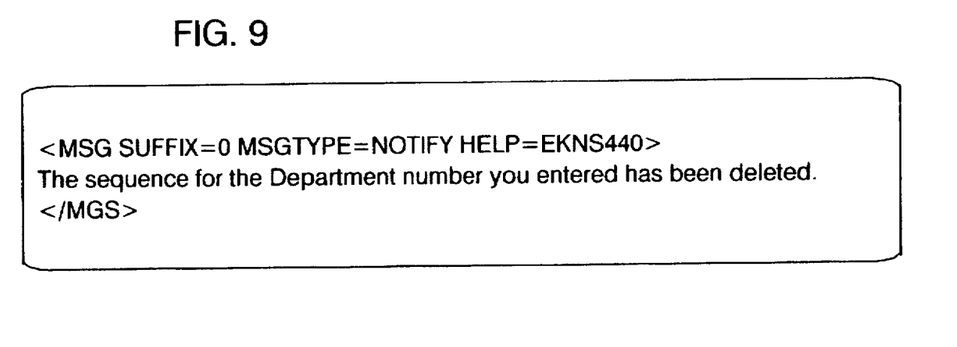
FIG. 9 shows a source Message part as displayed on a video display during an editing session.
Figure 10:
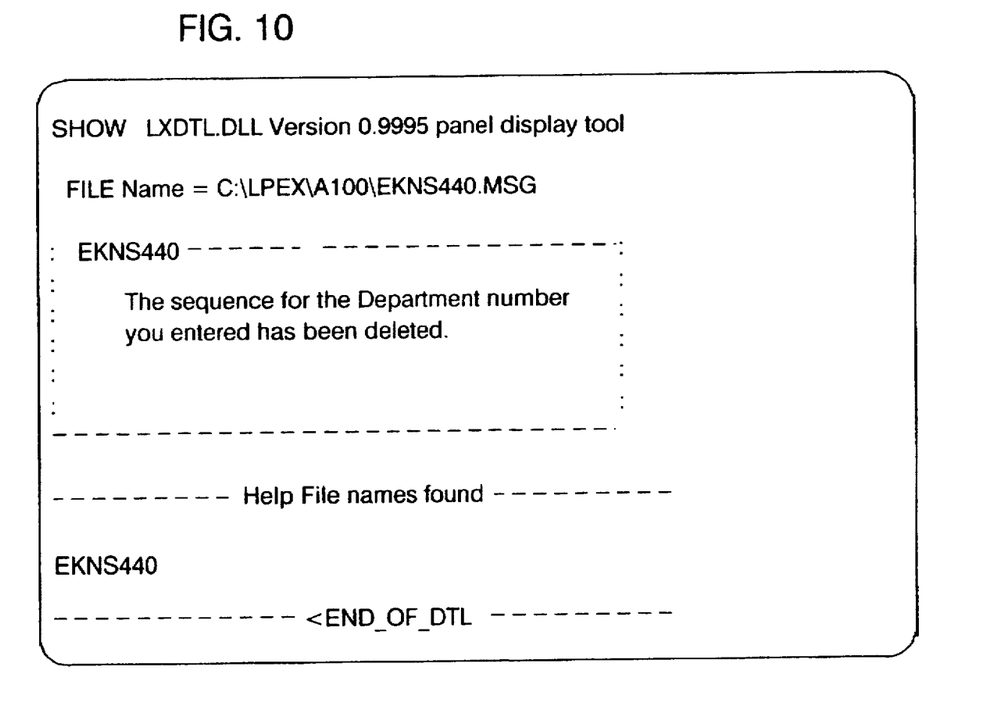
FIG. 10 shows a SHOW result of the source Message part of FIG. 9 as displayed on a video display after application of the panel tags translation tool of this invention.

FIG. 9 shows a source Message part 67 as seen during an editing session and FIG. 10 shows the SHOW result of that Message part 69.

Figure 11:
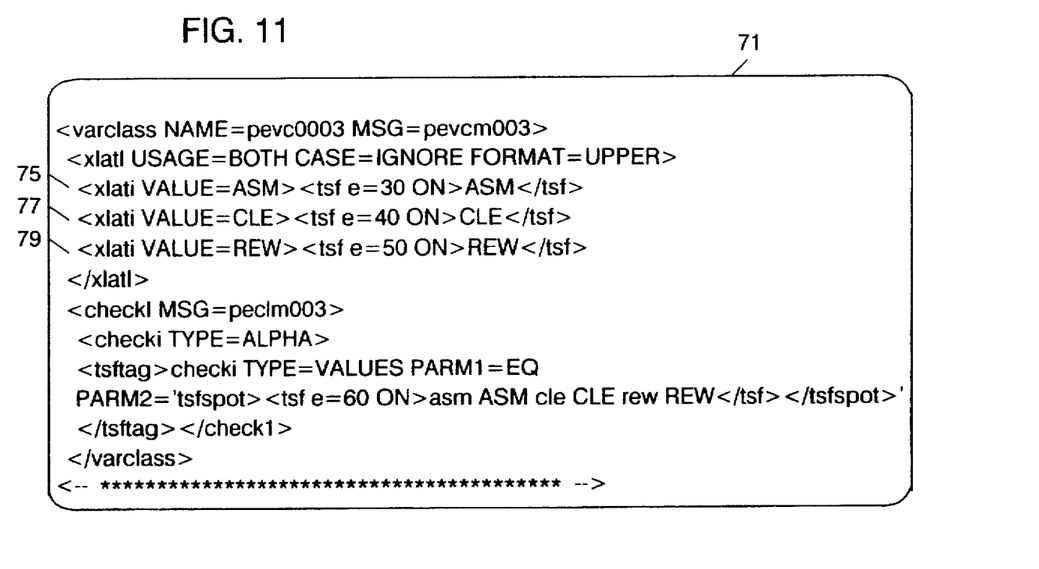
FIG. 11 shows a source Varclass part as displayed on a video display during an editing session.
Figure 12:
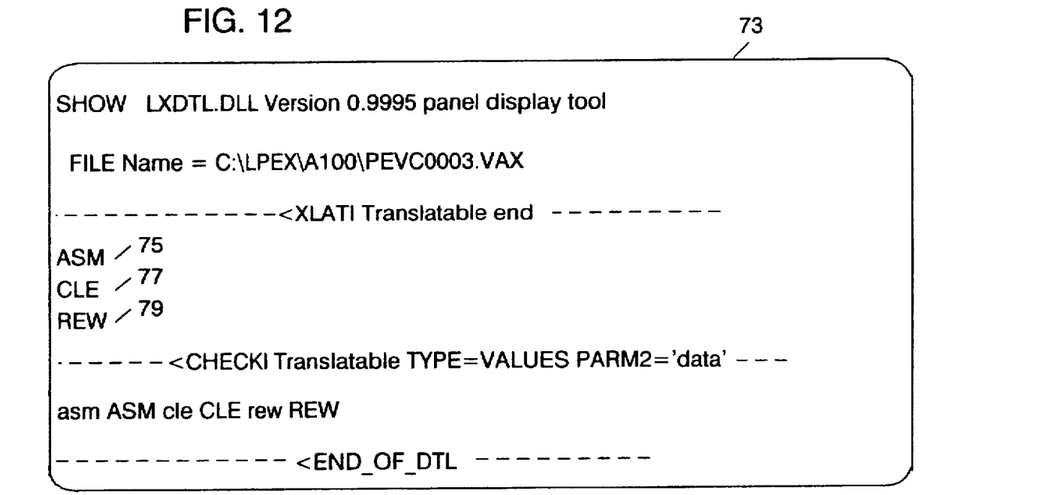
FIG. 12 shows a SHOW result of the source Varclass part of FIG. 11 as displayed on a video display after application of the panel tags translation tool of this invention.

FIG. 11 shows a source Varclass part 71 as seen during an editing session and FIG. 12 shows the SHOW result of that Varclass part 73. In the case of Varclass parts 71, the panel tags translation tool may be invoked to translate varclass entries, such as "ASM" 75, "CLE" 77 and "REW" 79, which as shown in FIG. 11, are within tag markers. Preferably, a special function, such as Protect/Unprotect, may be invoked from the translation editor to allow the translator to access the inside of a tag if required to do so.

Figure 13:
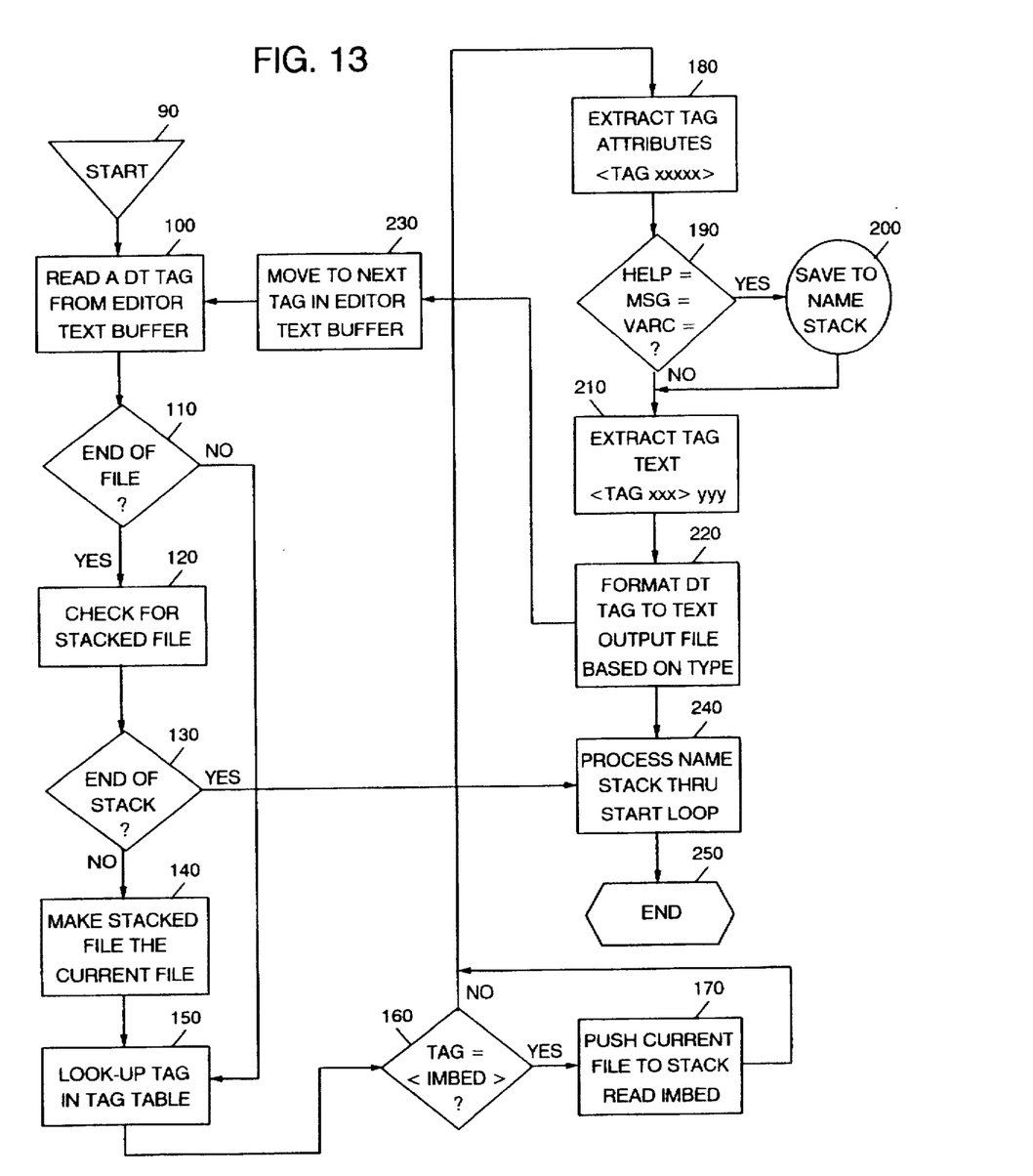
FIG. 13 illustrates the sequence of functional operations effected by the panel tags translation tool of this invention.

With reference to the data flow chart of FIG. 13, which shows the sequence of functional operations effected by the panel tags translation tool program, operation of the program starts when the translator invokes SHOW from the action bar. In block 90, the selected file is opened and the required memory is allocated. In block 100, the program then reads the first complete dialog tag from the selected file from the start tag marker to the next start tag marker. The program then determines at decision block 110 whether the current file is empty. If empty, the program proceeds to block 120. If not, the program proceeds to block 150.

At block 120, the program checks the imbed file stack for any previous files stored there. If the imbed stack is empty, the program ends the operation for the file stack and proceeds to block 240. If imbed files are present, the program in block 140 makes the stack file name and cursor position the current file. In block 150, the program looks for the current tag in a tag table to determine the tag type. In decision block 160, the program determines whether the tag type is an imbed tag. If the tag is an imbed type, the program proceeds to block 170 and the current file name and cursor position is pushed to the file stack and the imbedded file is read. In block 180, the internal tag attributes are extracted. In block 190, the program determines whether any of the tag attributes are Help, Message or Varclass types. Help, Message and Varclass filenames are stored in the name stack in block 200. In block 210, the program extracts the tag text and places it into a text buffer. In block 220, the program formats the text into columns, action bars, lists, etc., based upon the tag type and the tag attributes. In block 230, the program moves to the next tag in the current file and repeats the operations starting from block 100.

In block 240, the program accesses each filename in the name stack and processes it through the start loop in block 90. In block 250, the program returns to the file selection menu for selecting another file.

From the foregoing description of a preferred embodiment of this invention, it will be apparent that there has been provided a novel method for translating information from a source language to a target language. While described as having a special application in the translator's environment described herein, it is clear that the use of this method in other environments will be apparent to those skilled in the art. Various modifications to the preferred embodiment described herein may also be apparent to those skilled in the art without departing from the scope of the present invention, which is limited only by the appended claims.

Having thus described our invention, what we claim and desire to secure by Letters Patent is:

1. A method for controlling the translation of panel displays and associated panel tags on a display screen from a source language to a target language comprising the steps of:

opening a source language panel file having panel tags containing textual information;

opening a target language panel file;

translating said textual information of said source language panel file;

writing the output of said translated textual information of said source language panel file to said target language panel file;

displaying in a plurality of windows on said display screen said source language panel tag file, said target language panel tag file, a source language panel image and a target language panel image; and modifying said target language panel tag file if comparison of the source panel image with the target panel image indicates that the target language panel file requires modification.

2. A method for controlling the translation of panel displays and associated display tags on a display screen from a source language as described in claim 1 to a target language further comprising the steps of:

simultaneously displaying in a plurality of windows on said display screen a source language panel tag file, a target language panel tag file, a source language panel image and a target language panel image.

3. The method of claim 1 further comprising the steps of:

opening a source language subfile nested in said source language panel tag file;

said source language subfile having panel tags containing textual information;

resolving said source language subfile;

displaying said source language panel image with said source language subfile resolved;

opening a target language subfile nested in said target language panel tag file;

said target language subfile having panel tags containing textual information;

resolving said target language subfile; and displaying said target language panel image with said target language subfile resolved.

4. The method of claim 1 further comprising the steps of:

displaying a list of source language part files referred to within said source language panel tag file.

5. The method of claim 1 further comprising the steps of:

displaying a list of target language part files referred to within said target language panel tag file.

6. The method of claim 1 further comprising the steps of:

opening a source language Help part file referred to within said source language panel tag file;

said source language Help part file having panel tags containing textual information;

opening a target language Help part file; and displaying a source language Help part image.

7. The method of claim 6 further comprising the steps of:

translating said textual information of said source language Help part file;

writing the output of said translated textual information of said source language Help part file to said target language Help part file; and displaying a target language Help part image.

8. The method of claim 1 further comprising the steps of:

opening a source language Varclass part file referred to within said source language panel tag file;

said source language Varclass part file having panel tags containing textual information;

opening a target language Varclass part file; and displaying a source language Varclass part image.

9. The method of claim 8 further comprising the steps of:

translating said textual information of said source language part file;

writing the output of said translated textual information of said source language Varclass part file to said target language part file; and displaying a target language part image.

10. The method of claim 1 further comprising the steps of:

opening a source language Message part file referred to within said source language panel tag file;

said source language Message part file having panel tags containing textual information;

opening a target language Message part file; and displaying a source language Message part image.

11. The method of claim 10 further comprising the steps of:

translating said textual information of said source language Message part file;

writing the output of said translated textual information of said source language Message part file to said target language Message part file; and displaying a target Message part image.

12. A method for controlling the translation of panel displays and associated panel tags on a display screen from a source language to a target language comprising the steps of:

opening a source language panel file having panel tags containing textual information;

opening a target language panel file;

translating said textual information of said source language panel file;

writing the output of said translated textual information of said source language panel file to said target language panel file;

displaying in a plurality of windows on said display screen a target language panel tag file and a target language panel image; and modifying said target language panel tag file if viewing said target language panel image indicates that the target language panel file requires modification.

13. The method of claim 12 further comprising the steps of:

opening a target language imbed file nested in said target language panel tag file;

said target language imbed file having panel tags containing textual information;

resolving said target language imbed; and displaying said target language panel image with said target language imbed file resolved.

14. The method of claim 12 further comprising the steps of:

displaying a list of target language part files referred to within said target language panel tag file.

15. The method of claim 12 further comprising the steps of:

opening a source language Help part file referred to within said source language panel tag file;

said source language Help part file having panel tags containing textual information;

opening a target language Help part file; and displaying a source language Help part image.

16. The method of claim 15 further comprising the steps of:

translating said textual information of said source language Help part file;

writing the output of said textual information of said source language Help part file to said target language Help part file; and displaying a target language Help part image.

17. The method of claim 12 further comprising the steps of:

opening a source language Varclass part file referred to within said source language panel tag file;

said source language Varclass part file having panel tags containing textual information;

opening a target language Varclass part file; and displaying a source language Varclass part image.

18. The method of claim 17 further comprising the steps of:

translating said textual information of said source language Varclass part file;

writing the output of said translated textual information of said source language Varclass part file to said target language Varclass part file; and displaying a target language Varclass part image.

19. The method of claim 12 further comprising the steps of:

opening a source language Message part file referred to within said source language panel tag file;

said source language Message part file having panel tags containing textual information;

opening a target language Message part file; and displaying a source Message part image.

20. The method of claim 19 further comprising the steps of:

translating said textual information of said source language Message part file;

writing the output of said translated textual information of said source language Message part file to said target language Message part file; and displaying a target Message part image.

* * * * *